May 23, 1961     D. L. HANKINS     2,984,994

COOLING SYSTEM

Filed Feb. 9, 1960

*INVENTOR.*
DALE L. HANKINS
BY
*ATTORNEY*

United States Patent Office 2,984,994
Patented May 23, 1961

2,984,994
COOLING SYSTEM

Dale L. Hankins, Bettendorf, Iowa, assignor to The Bendix Corporation, a corporation of Delaware Filed Feb. 9, 1960, Ser. No. 7,570
4 Claims. (Cl. 62—457)

This invention relates to a cooling system and more particularly to a system wherein a liquid is converted to a gas for maintaining an aviator's suit substantially near ambient environmental conditions.

The aviator flying present high performance aircraft is required to wear a tight-fitting flying suit encompassing his entire body. In the aircraft means are provided for cooling and pressurizing the suit but no adequate means are provided during the preflight period. During the preflight period when the aviator wears the suit, perspiration occurs resulting in the collection of moisture within the suit and a general uncomfortable condition for the aviator. The preflight period during which the aviator must wear the suit may be up to several hours in duration which may include briefing time, the time required to go to the aircraft, and the time required for the preflight check of the aircraft.

The invention has as one of its objects the provision of a system for cooling, controlling the humidity, and circulating the air in and through a confined space.

Another object of the invention is to provide a cooling system for use with an aviator's suit wherein the gas circulating through the suit is a mixture of the ambient air and a gas having been converted from the liquid state.

A further object of the invention is to provide a cooling system wherein means are provided for combining the coolant and the ambient air whereby ambient air is drawn across the components of the system. Advantageously the ambient air is used to evaporate the liquid to the coolant gas then the air which has itself been cooled is combined with the coolant gas.

A still further object of the invention is to provide a cooling system having an accurate, inexpensive, and ready means to indicate the quantity of liquid coolant remaining in the system.

A still further object of the invention is to provide a small and light-weight cooling system for use with an aviator's suit which may be hand or back carried by an aviator.

The foregoing and other objects and advantages of the invention will appear more fully hereinafter from a consideration of the detailed description which follows; taken together with the accompanying drawing wherein an embodiment of the invention is illustrated. It is to be expressly understood, however, that the drawing is for the purpose of illustration and description and is not to be considered as defining the limits of the invention.

Figure 1:
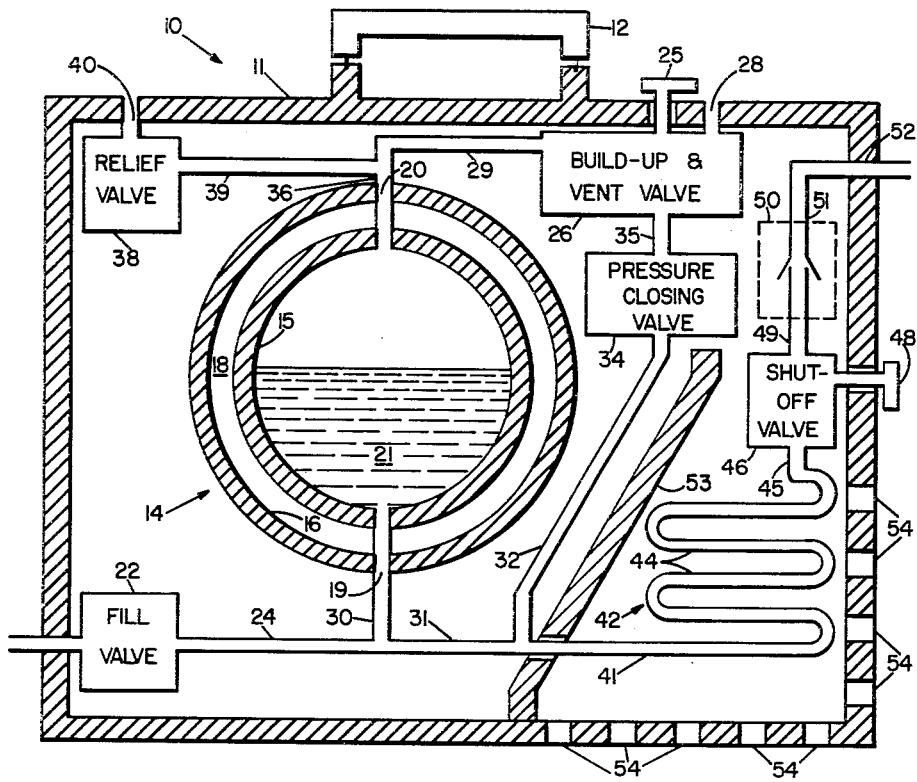
Fig. 1 is a schematic drawing of one embodiment of the inventive cooling system.

Referring now to the drawing and to Fig. 1, numeral 10 designates a cooling system having a housing 11. Carrying handle 12 is connected to housing 11 and disposed for easy hand carrying of the cooling system 10. The means for carrying the cooling system 10 is shown in the form of the handle but may advantageously be made to be carried as a back-pack or carried by means of a strap carried over the shoulder of the user.

Numeral 14 designates a liquid container disposed in housing 11 having an inner wall 15 and an outer wall 16 forming evacuated chamber 18. Liquid port 19 is disposed at the bottom of container 14 and gas port 20 is disposed at the top of container 14. The liquid 21 in container 14 is a liquefied gas which may advantageously be liquid oxygen, nitrogen, or air.

Liquid port 19 of liquid container 14 is connected to fill valve 22 by means of tubing 24. When the container 14 is being filled with liquid through fill valve 22 the handle 25 of build-up and vent valve 26 is turned to the "fill" position thereby venting the interior of build-up and vent valve 26 to the atmosphere through vent port 28. Build-up and vent valve 26 is similar to the valve shown in Patent 2,840,110 to D. E. Parsons and Bendix Aviation Corporation as assignee; the assignee of the present invention. The gas in the container 14 which is being forced out of the container 14 by the incoming liquid will pass through gas port 20, tubing 29, build-up and vent valve 26, and vent port 28 to the ambient atmosphere.

After completion of the filling operation of the container 14 handle 25 of build-up and vent valve 26 is turned to either the "standby" or "operate" position. In the "standby" position all passages through build-up and vent valve 26 are closed. In the "operate" position vent port 28 is closed and an external "build-up" circuit is formed whereby liquid port 19 and gas port 20 are in direct communication by means of tubing 30, 31, 32, pressure closing valve 34, tubing 35, build-up and vent valve 26, tubing 29, and tubing 36. Pressure closing valve 34 will close the "build-up" circuit when a predetermined pressure is reached in the circuit.

Relief valve 38 is in direct communication with gas port 20 of the container 14 by means of tubing 36 and 39. Relief valve 38 will vent gas to the ambient atmosphere through vent port 40 after a predominated pressure in container 14 is reached.

Liquid from container 14 will flow through liquid port 19, tubing 30, 31, and 41 and into heat exchanger 42. Heat exchanger 42 may be any one of a variety of exchangers for converting a liquid to a gas or may be in the form of tubing 44 as shown. Gas from heat exchanger 42 flows through tubing 45 to manual shut-off valve 46. When gas is required, handle 48 of shut-off valve 46 is turned to the "on" position and gas will flow through valve 46 and inlet tubing 49 to air-gas mixing device 50. The degree of movement of handle 48 will control the rate of gas flow through shut-off valve 46. The air-gas mixture from mixing device 50 flows through outlet tubing 51 which leaves housing 11 through opening 52 and enters the device to be cooled (not shown). The device which is to be cooled may be an aviator's pressure suit.

A plurality of holes 54 are formed through housing 11 for circulating air across heat exchanger 42 and into air-gas mixing device 50. Advantageously the warm air entering the housing 11 through holes 54 warms the tubing 44 which evaporates the liquid flowing therethrough. The air in turn is cooled and drawn into air-gas mixing device 50 to be mixed with the cold gas which has left heat exchanger 42. Baffle plate 53 is joined to housing 11 and is disposed to direct the air passing through 54 across heat exchanger 42 to air-gas mixing device 50.

Figure 2:
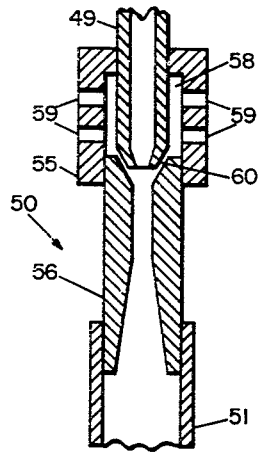
Fig. 2 is a schematic drawing in detail of the venture portion of the invention cooling system shown in Fig. 1.

Referring now to Fig. 2 of the drawing, there is shown in detail one form of an air-gas mixing device 50 which may be used in the cooling system shown in Fig. 1. Air-gas mixing device 50 has venturi housing 55 having one end thereof disposed to receive inlet tubing 49 and the other end thereof to receive venturi 56. Housing 55 forms mixing chamber 58 and has air intake holes 59 for admitting ambient air into chamber 58. Inlet tubing 49 terminates in nozzle 60 in air mixing relationship with venturi 56. The air-gas mixture flowing through venturi 56 flows into outlet tubing 51 which is in fluid communication with the device to be cooled.

Figure 3:
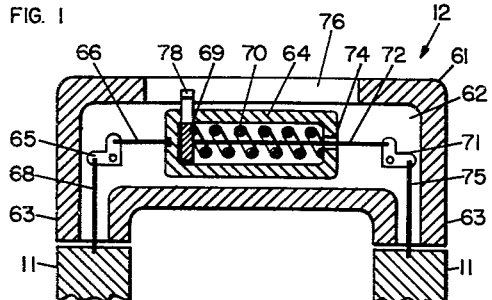
Fig. 3 is a detailed view in elevation of the handle portion of the inventive cooling system shown in Fig. 1.
Figure 4:
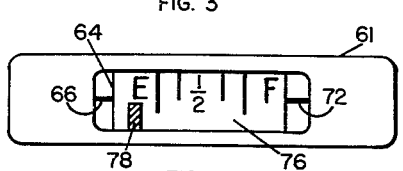
Fig. 4 is a detailed top view of the handle shown in Fig. 3.

Referring now to Figs. 3 and 4 of the drawing there is shown in detail the carrying handle 12 of Fig. 1. Handle 12 has a U-shaped housing 61 having a hollowed interior 62. The two legs 63 of housing 61 are disposed for abutment against housing 11 of the liquid cooling system 10. Hollow cylinder 64 is disposed in housing 61 for movement in the base thereof. The first end of said cylinder 64 is connected to the first end of pivoting L lever 65 by means of solid link 66. The second end of lever 65 is connected to housing 11 by means of solid link 68. A disk 69 is disposed in hollow cylinder 64 for lengthwise movement therein and is biased against the first end of said cylinder 64 by means of spring 70. Disk 69 is connected to the first end of pivoting L lever 71 by means of solid link 72 which passed through hole 74 in the second end of said hollow cylinder 64. The second end of pivoting L-lever 71 is connected to housing 11 of cooling system 10 by means of solid link 75.

Visual indicating means which may be of the form shown in Fig. 4 are imprinted on hollow cylinder 64 and are viewed through window 76 in housing 61. Pointer 78 is attached to disk 69 and is slidable in a slot (not shown) in hollow cylinder 64. The handle 12 will give the correct indication of fluid remaining in container 14 regardless of the manner in which handle 12 is held.

In operation of the cooling system shown in the drawing the liquid container 14 is filled by connecting fill valve 22 to a liquid supply line. Build-up and vent valve 26 is set by means of handle 25 to the "fill" position. Thus a fluid path is open from the container 14, gas port 20, tubing 36 and 29, build-up and vent valve 26, and vent port 28 to the ambient atmosphere. Liquid introduced through fill valve 22 passes through tubing 24 and 30 and through liquid port 19 into container 14. As the liquid enters the container 14, gas in the container 14 is vented out of the gas port 20 and to the ambient atmosphere through vent port 28. When liquid flows overboard through gas vent 28 the container 14 is full and the liquid supply line is removed.

For the purpose of illustrating the operation of the novel cooling system, various pressures will be used. These pressures are not to be construed to define the limits of the invention, a wide range of pressures may be used which are within the scope of the novel cooling system.

Depending upon whether the cooling system is to be used shortly after filling or at some later time, the handle 25 of build-up and vent valve 26 is turned to the "operate" or "standby" position. When in the "standby" position all passages through build-up and vent valve 26 are closed. In this "standby" position none of the liquid 21 will leave the container 14. There will be a slow build-up of pressure in the system as the liquid 21 absorbs heat from radiation and conduction and is vaporized. The pressure will continue to rise until the pressure reaches 90 p.s.i.g. when relief valve 38 will open and vent gas to the atmosphere through vent port 40 from container 14 by means of gas port 20, tubing 36 and 39, and relief valve 38.

At any time the handle 25 may be turned from the "standby" position to the "operate" position whether the pressure in the system is above or below the operating pressure of 70 p.s.i.g. When the system is to be used handle 25 is turned to the "operate" position and handle 48 of shut-off valve 46 is turned to the "on" position. When in the "operate" position vent port 28 of build-up and vent valve 26 is closed and the passageway through valve 26 is open.

When the system pressure is below 70 p.s.i.g. a build-up circuit is formed. The build-up circuit comprises an external fluid communication path from the bottom to the top of container 14. The build-up circuit comprises liquid port 19, tubing 30, 31, and 32, pressure closing valve 34, tubing 35, build-up and vent valve 26, tubing 29 and 36, and gas port 20. In this condition, the liquid 21 will flow by gravity out of container 14 and into the build-up circuit where it absorbs heat and vaporizes. The liquid which has been vaporized will flow through pressure closing valve 34 and to the top of container 14, as the liquid vaporizes the pressure in the system rises. When the pressure in the system reaches 70 p.s.i.g., the pressure closing valve 34 will prevent further flow of liquid through the build-up circuit.

When the system pressure is above 70 p.s.i.g. the liquid 21 will flow out of container 14 through liquid port 19, tubing 30, 31, and 41 to heat exchanger 42 where it is vaporized. The gas will flow through the open shut-off valve 46 and to air-gas mixing device 50. The gas is mixed with the ambient air in proportions substantially commensurate with the rate of gas flow. The ambient air supplied to air-gas mixing device 50 is drawn through the holes 54 in housing 11 and across heat exchanger 42 where the air is cooled by the air-gas mixing device 50. The mixture of gas and air flowing from mixing device 50 passes through tubing 51 to the device to be cooled.

While the cooling system as shown in the drawing is of the construction shown and described, it is understood that the instant invention is not limited to any particular form or construction. Moreover, other changes and modifications of the novel cooling system contemplated therein may be made by those skilled in the art without departing from the scope of the instant invention.

I claim:

1. A portable system for cooling, controlling the humidity and circulating the air in and through an aviator's suit which system employs a liquid oxygen to gaseous oxygen conversion unit comprising a thin shell housing having said liquid oxygen to gaseous oxygen conversion unit disposed therein, a liquid storage vessel, a heat exchanger in fluid communication with said storage vessel, means for withdrawing the liquid from said storage vessel and passing said liquid oxygen into said heat exchanger where the liquid is converted into an oxygen gas stream, means for combining said oxygen gas stream with the ambient air at a rate commensurate with the rate of flow of said oxygen gas stream, valve means for manually regulating the oxygen gas flow to said means for combining gas and air, vent means disposed through said housing enabling ambient air to pass over said heat exchanger to said means for combining gas and air and means joined to said housing for indication of the liquid oxygen remaining in said storage vessel.

2. The invention defined in claim 1 wherein said means for combining gas and air comprises a venturi, an injector having one end thereof disposed for fluid injection into said venturi and said second end in fluid communication with said heat exchanger, and an air mixing housing encompassing said injector and joined to said venturi.

3. A portable system for cooling, controlling the humidity and circulating the air in and through a human's suit which system employs a cryogenic liquid to gas conversion unit comprising, a thin shell housing having said cryogenic liquid to gas conversion unit disposed therein, a liquid storage vessel, a pressure build-up circuit between the liquid and gas phase sections of said liquid storage vessel, a supply circuit in fluid communication with the liquid phase of said storage vessel comprising a heat exchanger, means for withdrawing said cryogenic liquid from said liquid storage vessel and passing said liquid into said heat exchanger where the liquid is converted into a gas stream, means for combining said gas stream with the ambient air at a rate commensurate with the rate of flow of said gas stream, valve means for manually regulating the gas flow to said means for combining gas and air, vent means disposed through said housing enabling ambient air to pass into said housing and means disposed within said housing for directing said ambient air across said heat exchanger to said means for combining gas and air and disposed to prevent said ambient air from passing around said liquid storage vessel.

4. The invention defined in claim 3 wherein said means for combining gas and air comprises a venturi, an injector having one end thereof disposed for fluid injection into said venturi and said second end in fluid communication with said heat exchanger, and an air mixing housing encompassing said injector and joined to said venturi.

References Cited in the file of this patent

UNITED STATES PATENTS

| | | |
|---|---|---|
| 2,413,386 | Schulz | Dec. 31, 1946 |
| 2,731,808 | Stark | Jan. 24, 1956 |
| 2,819,590 | Green | Jan. 14, 1958 |